(12) United States Patent
Walker et al.

(10) Patent No.: US 10,099,506 B2
(45) Date of Patent: Oct. 16, 2018

(54) LASER BLEACH MARKING OF AN ANODIZED SURFACE

(71) Applicant: Apple Inc., Cupertino, CA (US)

(72) Inventors: Matthew D. Walker, Cupertino, CA (US); Duy P. Le, Santa Clara, CA (US); Burak Metin, Cupertino, CA (US); Junjie Xu, Cupertino, CA (US); Ming Li, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/630,594

(22) Filed: Jun. 22, 2017

(65) Prior Publication Data

US 2018/0065402 A1  Mar. 8, 2018

(30) Foreign Application Priority Data

Sep. 6, 2016  (WO) ................ PCT/CN2016/098170

(51) Int. Cl.
| | | |
|---|---|---|
| H04B 1/03 | (2006.01) | |
| B44C 1/22 | (2006.01) | |
| B23K 26/362 | (2014.01) | |
| B23K 26/40 | (2014.01) | |
| C25D 11/24 | (2006.01) | |
| H04B 1/3888 | (2015.01) | |
| B23K 103/10 | (2006.01) | |
| B23K 103/16 | (2006.01) | |
| B23K 101/34 | (2006.01) | |

(52) U.S. Cl.
CPC ............ *B44C 1/228* (2013.01); *B23K 26/362* (2013.01); *B23K 26/40* (2013.01); *C25D 11/24* (2013.01); *H04B 1/3888* (2013.01); *B23K 2201/35* (2015.10); *B23K 2203/10* (2013.01); *B23K 2203/166* (2015.10)

(58) Field of Classification Search
CPC ........ H04B 1/03; H04B 1/3888; B44C 1/228; C25D 11/24; B23K 26/362; B23K 2201/35; B23K 2203/166; B23K 2203/10
See application file for complete search history.

(56) References Cited

U.S. PATENT DOCUMENTS

| | | |
|---|---|---|
| 1,608,108 A | 11/1926 | Martus et al. |
| 2,473,848 A | 8/1947 | Baxter |
| 2,821,589 A | 1/1958 | Needham |

(Continued)

FOREIGN PATENT DOCUMENTS

| | | |
|---|---|---|
| CN | 101665969 | 3/2010 |
| CN | 101665971 | 3/2010 |

(Continued)

OTHER PUBLICATIONS

Jaeger, "Color Solid Ink Printing," imaging.org, 4 pages, at least as early as Sep. 23, 2014.

(Continued)

*Primary Examiner* — Andrew Wendell
(74) *Attorney, Agent, or Firm* — Dorsey & Whitney LLP (57) ABSTRACT

A deep black housing for a handheld electronic device is disclosed having one or more high resolution, bleached markings. The bleached markings are significantly lighter than the housing and exhibit a smooth appearance. Methods for preparing a housing having the finish and markings are also disclosed, including housings for use in mobile phones.

20 Claims, 9 Drawing Sheets

(56) References Cited

U.S. PATENT DOCUMENTS

| | | | |
|---|---|---|---|
| 3,123,792 A | 3/1964 | Klemm | |
| 3,471,663 A | 10/1969 | Farrell | |
| 3,982,917 A | 9/1976 | Upton | |
| 4,227,059 A | 10/1980 | Ogawa | |
| 4,340,791 A | 7/1982 | Sorenson | |
| 5,180,051 A | 1/1993 | Cook et al. | |
| 5,214,530 A | 5/1993 | Coombs et al. | |
| 5,215,864 A | 6/1993 | Laakmann | |
| 5,327,201 A | 7/1994 | Coleman et al. | |
| 5,496,977 A | 3/1996 | Date et al. | |
| 5,523,125 A | 4/1996 | Kennedy et al. | |
| 5,607,607 A | 3/1997 | Naiman et al. | |
| 5,718,326 A | 2/1998 | Larose et al. | |
| 5,936,213 A | 8/1999 | Bisquez et al. | |
| 6,040,543 A | 3/2000 | Mina et al. | |
| 6,084,190 A | 7/2000 | Kenmochi | |
| 6,196,738 B1 | 3/2001 | Shimizu et al. | |
| 6,201,196 B1 | 3/2001 | Wergen | |
| 6,565,770 B1 | 5/2003 | Mayer et al. | |
| 6,591,457 B1 | 7/2003 | Howie, Jr. | |
| 6,630,635 B1 | 10/2003 | Doepner | |
| 6,667,450 B2 | 12/2003 | Bulin et al. | |
| 6,670,571 B2 | 12/2003 | Dance | |
| 6,707,358 B1 | 3/2004 | Massman | |
| 6,762,381 B2 | 7/2004 | Kunthady et al. | |
| 7,101,603 B2 | 9/2006 | Okamura et al. | |
| 7,165,846 B2 | 1/2007 | Shinya | |
| 7,297,221 B2 | 11/2007 | Hikita | |
| 7,414,213 B2 | 8/2008 | Hwang et al. | |
| 7,531,765 B2 | 5/2009 | Komagata | |
| 7,727,618 B2 | 6/2010 | Iwano | |
| 8,003,200 B2 | 8/2011 | Nashiki et al. | |
| 8,198,626 B2 | 6/2012 | Lee et al. | |
| 8,222,773 B2 | 7/2012 | De Luliis et al. | |
| 8,232,502 B2 | 7/2012 | Young et al. | |
| 8,529,775 B2 | 9/2013 | Costin et al. | |
| 8,640,413 B2 | 2/2014 | Ruggie et al. | |
| 8,681,485 B2 * | 3/2014 | Du | H05K 5/0243 361/679.02 |
| 8,802,220 B2 | 8/2014 | Cao et al. | |
| 8,859,920 B2 | 10/2014 | Manullang et al. | |
| 8,867,320 B2 | 10/2014 | Suzuki et al. | |
| 8,882,280 B2 | 11/2014 | Fukaya et al. | |
| 8,933,347 B2 * | 1/2015 | Kiple | B23P 11/00 174/541 |
| 9,629,271 B1 | 4/2017 | Lancaster-Larocque et al. | |
| 9,844,898 B2 | 12/2017 | Hill et al. | |
| 2005/0287301 A1 | 12/2005 | Ljubomirsky | |
| 2006/0024476 A1 | 2/2006 | Leland et al. | |
| 2008/0299408 A1 | 12/2008 | Guo et al. | |
| 2009/0166343 A1 | 7/2009 | Lappalainen et al. | |
| 2009/0237782 A1 | 9/2009 | Takamatsu et al. | |
| 2010/0026656 A1 | 2/2010 | Hotelling et al. | |
| 2011/0109590 A1 | 5/2011 | Park et al. | |
| 2011/0177300 A1 | 7/2011 | Hankey et al. | |
| 2011/0193928 A1* | 8/2011 | Zhang | B41J 2/442 347/224 |
| 2012/0103778 A1 | 5/2012 | Obata et al. | |
| 2012/0328905 A1 | 12/2012 | Guo et al. | |
| 2013/0075126 A1* | 3/2013 | Nashner | B23K 26/0084 174/50 |
| 2013/0112536 A1 | 5/2013 | Shah et al. | |
| 2013/0120314 A1 | 5/2013 | Ishibashi et al. | |
| 2013/0140746 A1 | 6/2013 | Heverly et al. | |
| 2013/0248373 A1* | 9/2013 | Shen | C25D 11/26 205/120 |
| 2014/0363608 A1 | 12/2014 | Lancaster-Larocque et al. | |
| 2014/0363623 A1* | 12/2014 | Sun | C25D 11/08 428/119 |
| 2015/0062709 A1 | 3/2015 | Matsuyuki et al. | |
| 2015/0064432 A1 | 3/2015 | Matsuyuki et al. | |
| 2016/0373154 A1* | 12/2016 | Barbarossa | H04B 1/3888 |
| 2017/0159164 A1* | 6/2017 | Huang | C23C 4/18 |

FOREIGN PATENT DOCUMENTS

| | | |
|---|---|---|
| CN | 101729624 | 6/2010 |
| CN | 102102465 | 6/2011 |
| CN | 201945987 | 8/2011 |
| CN | 201956238 | 8/2011 |
| CN | 102725663 | 10/2012 |
| CN | 102752982 | 10/2012 |
| CN | 202632259 | 12/2012 |
| CN | 202649955 | 1/2013 |
| CN | 102958640 | 3/2013 |
| CN | 202854790 | 4/2013 |
| CN | 103112308 | 5/2013 |
| CN | 103415370 | 11/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| GB | 581824 | 10/1946 |
| GB | 957644 | 5/1964 |
| JP | H0593811 | 4/1993 |
| JP | 201263839 | 3/2012 |
| JP | 201410814 | 1/2014 |
| KR | 1020090131944 | 4/2010 |
| TV | 201231792 | 8/2012 |
| TW | M414616 | 10/2011 |
| WO | WO01/34408 | 5/2001 |
| WO | WO2011/076294 | 6/2011 |

OTHER PUBLICATIONS

International Search Report and Written Opinion, PCT/CN2015/098170, 13 pages, dated May 22, 2017.

* cited by examiner

FIG. 8

LASER BLEACH MARKING OF AN ANODIZED SURFACE

CROSS-REFERENCE TO RELATED APPLICATION(S)

This application claims the benefit under 35 U.S.C. § 119 and 37 C.F.R. § 1.55 to PCT Application No. PCT/CN2016/098170, filed Sep. 6, 2016 and titled "Laser Bleach Marking of an Anodized Surface," the disclosure of which is hereby incorporated herein by reference in its entirety.

FIELD

The disclosure relates generally to laser bleached markings of an anodized surface, and more particularly to laser bleached markings on handheld electronic housings that have anodized surfaces.

BACKGROUND

Handheld electronic devices, such as mobile phones, are becoming smaller, lighter and more powerful. The design challenge of making these devices with these parameters requires new or modified designs, materials and components. One such challenge brought on by new designs and materials is uniformity of appearance, as thinner, and typically more fragile, materials and components are often more liable for coloring and marking imperfections.

Handheld electronic devices are also held to a high standard of quality. These devices are typically under constant use, and reflect a standard or sophistication associated with the user. One aspect of quality is the various markings on the exterior surface of the devices. Marks provide a distinctive look that identifies the product with a company, and distinguishes the product from its competitors. The mark builds goodwill and brand reputation in the product and with the company that sells the product. A poorly replicated mark on a handheld electronic device could damage and diminish the perceived quality of the product, for example, the quality of a mobile phone.

SUMMARY

Embodiments herein include an aluminum housing for a handheld electronic device. The aluminum housing has a dyed anodization layer, and an alloy substrate adjacent the dyed anodization layer. A melted portion is formed in the dyed anodization layer to a depth of 1 to 2 μm. In some aspects, the melted portion has a surface roughness of from about 60 nm to about 80 nm. In other aspects, the melted portion has a surface roughness of at least 1 μm. In still other aspects, the dyed anodization layer on the housing has a Lightness (L*) of 30 or less, while the melted portion on the housing has a L* of 50 or more, and more typically, the housing a L* of 25 or less, and the melted portion a L* of 60 or more. The handheld electronic device can be a mobile phone.

Embodiments herein also include a handheld electronic device having an aluminum alloy substrate with an interior surface configured to receive a plurality of electronic components associated with the handheld electronic device. The aluminum alloy substrate also has an exterior surface abutted to a dyed anodization layer. A bleached mark is formed in the dyed anodization layer such that the bleached mark is formed from at least partially overlapping laser markings. In some aspects, the bleached mark has a surface roughness of approximately 60 nm to 80 nm, and in other aspects, the bleached mark has a surface roughness of approximately 1 μm or more. In some embodiments, the overlapping laser markings are formed from a plurality of laser marks having an average diameter of 30 μm. Adjacent overlapping laser markings can overlap each other by as much as 90% or more, by area. A series of overlapping laser markings can form a first bleached row and a second bleached row, where the line-to-line distance between the first bleached row and second bleached row is approximately 40 μm. Additional bleached rows are envisioned, each separated by a 40 μm line to line distance.

In another embodiment, a method for making a bleached mark in a housing of a handheld electronic device is described. The housing for the handheld electronic device is polished to a near finish, or media blasted to provide a matted surface. The surface is then anodized and dyed. An ultraviolet (UV) laser etches a region in the dyed anodized surface to form a predetermined mark, such that the L* difference between the etched and non-etched surface is at least 25, and more typically at least 30. In some aspects, the handheld electronic device is a mobile phone. The UV laser can etch the dyed anodization surface with a laser marking diameter of from about 25 μm to about 35 μm, and a line-to-line spacing of approximately 40 μm.

BRIEF DESCRIPTION OF THE DRAWINGS

The disclosure will be readily understood by the following detailed description in conjunction with the accompanying drawings, wherein like reference numerals designate like structural elements, and in which.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to housings for handheld electronic devices that have a dark finish, typically black, having an outer surface with one or more visible, lighter markings thereon. Markings can be textual or graphic, and are typically of high resolution. Housing surfaces are typically anodized and dyed, and the markings are bleached in the dyed anodized layer.

Housings of the disclosure are formed from an aluminum alloy substrate, although other similar materials are within the scope of this disclosure. An exterior surface of the aluminum alloy substrate may have a near-mirror finish, or alternatively, a matted or textured finish. A dyed anodization layer abuts the exterior surface of the aluminum alloy substrate. Average anodization layer pore size is from about 10 nm to about 40 nm, and more typically 15 nm to 35 nm.

Markings in accordance with the disclosure are visible on an exterior surface of the housing. Markings are bleached in the dyed anodization layer through use of a controlled laser etching process. Markings show little to no micro-fracturing in the dyed anodized layer due to the laser bleaching process, as is described in accordance with embodiments herein. Markings can be smooth, or have a smooth look, where the laser bleaching of the mark causes a slight melting of the surface of the dyed anodization layer, typically 1 to 2 µm in depth.

The disclosure also relates to methods for manufacturing housings with uniform dark or black finishes, and having one or more visible bleached markings on an exterior surface of the housing. Housings for handheld electronic device are formed from aluminum alloy substrate that have been formed into an appropriate shape for supporting and surrounding the various components necessary for the handheld electronic device. The housing is anodized to exhibit an anodization layer, with average pore size between about 10 nm and 40 nm, and more typically 15 nm and 35 nm, on at least its exterior surface, followed by dyeing with a dark dye, typically black. Controlled laser etching of the dyed anodized layer is performed to bleach the dyed anodization layer using specific parameters discussed herein. The marking is visible and lighter than the non-bleached housing surface. Bleached markings can be slightly melted by the laser, leaving a smooth look or finish. Markings in accordance with embodiments herein are precise and crisp, showing high resolution.

These and other embodiments are discussed below with reference to FIGS. 1-8. However, those skilled in the art will readily appreciate that the detailed description given herein with respect to these Figures is for explanatory purposes only and should not be construed as limiting.

Figure 1:
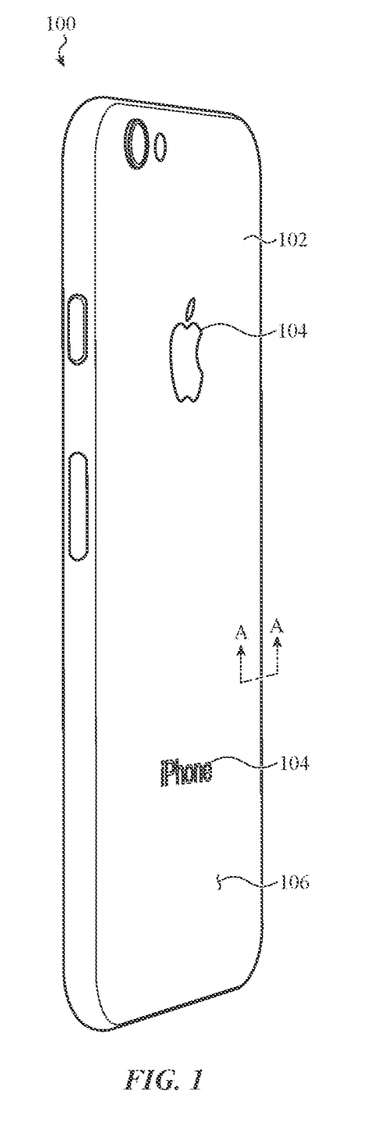
FIG. 1 shows a handheld electronic device having a housing with markings in accordance with embodiments herein.

FIG. 1 shows a handheld electronic device 100, for example a mobile phone, tablet computer or other portable device, having at least one surface 102 on which a product mark 104 has been applied through laser bleaching. For example, a mobile phone housing 106 may exhibit a deep black color about part or all of its surface. A lighter marking 104, for example a company's logo or text, is laser bleached into the housing 106 to show a mark with high resolution.

The housing 106 of the mobile phone, or other handheld electronic device, is typically formed of an aluminum alloy, and is forged, molded, machined or otherwise processed into a desired shape. The housing at least partially encloses and supports the internal components associated with the mobile phone. The housing has an anodized outer or exterior surface, with a dark dye incorporated therein, e.g., black, dark royal blue, dark brown, and the like. For purposes of this disclosure, the dye will be discussed as being black, but as discussed above, other dark dyes can be utilized. As shown in FIG. 1, a predetermined marking 104 can be formed by selectively altering the dye, such that the marking is lighter and of higher resolution. Markings can be textual or graphic and of a size visible to a user. Markings can provide information, branding, certifications, standards, advertisements and/or the like. Housings 106 can exhibit one or more markings in accordance with embodiments herein, for example, a housing with a visible logo and product name.

Figure 2:
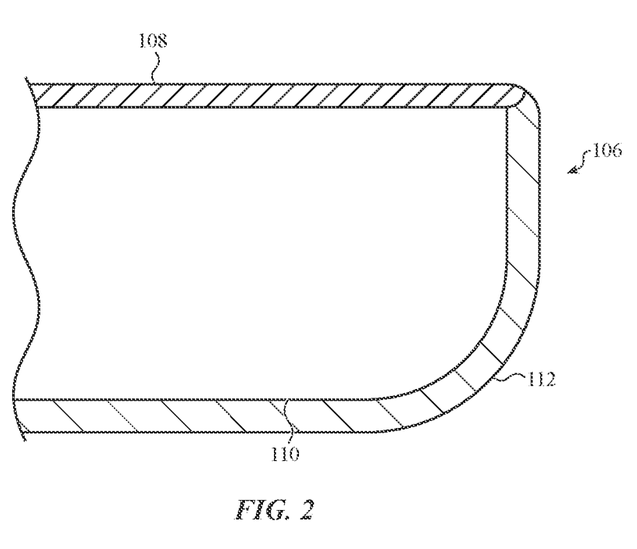
FIG. 2 is a cross-sectional schematic view of a housing having an interior and exterior surface in accordance with embodiments herein.

FIG. 2 is a cross-sectional schematic along line A-A of FIG. 1. A housing 106 in accordance with embodiments herein is coupled to a cover glass 108. The housing has an internal 110 and external surface 112, where the internal surface 110 supports and surrounds various structural and electronic components of the mobile phone (not shown). Although both surfaces of the housing can be anodized and dyed, see below, only the external surface 112 is typically polished to a finish in accordance with embodiments herein.

In one embodiment, the external surface 112 of the housing 106 is polished to a mirror like surface. Polishing is via a flat polish or other like method to provide an external surface that does not show a tangency break or cutter marks, and presents a mirror or near mirror finish. It is also envisioned that only some portion of the exterior surface, or no portion of the external surface, be polished to a mirror or mirror like surface, although typical embodiments include polishing of the entire exterior surface.

In an alternative embodiment, the external surface 112 of the housing 106 is blasted, sanded, abraded, or otherwise treated with zirconia powder or beads (or other like material) to exhibit a roughened surface (as opposed to being polished) (not shown). The roughened surface typically shows an average Ra of from about 8 to 12 µm, and more typically an average Ra of about 10 µm, and most typically an average Ra of 10 µm. The blasted surface shows a textured finish, where a part's surface morphology, i.e., the difference between any one peak and any one valley on a housing's surface, can be up to 7 µm, and more typically, up to 5 µm, and most typically between 3 to 5 µm.

Note that embodiments can also include housings having an external surface not polished or textured. Where the device does not require a mirror or matted finish, a housing polish or media blast is optional.

Figure 3A:
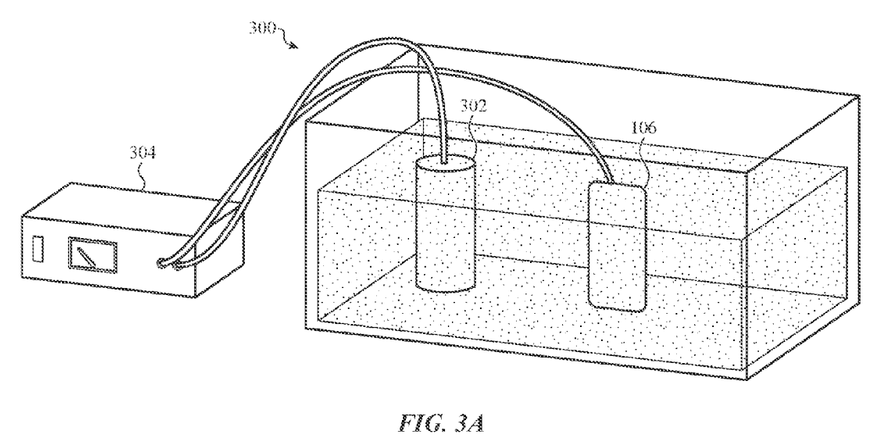
FIG. 3A shows a housing undergoing anodization in accordance with embodiments herein.

As noted above, housings 106 in accordance with the present disclosure have an inner and outer surface. In one embodiment, the housing is anodized in an anodization bath 300 as is shown in FIG. 3A. A housing 106 in accordance with embodiments herein is placed in an anodization bath 300 as the anode, for controlled anodization layer growth on the housing surface. A cathode 302 is shown in the bath, as is a separate power supply 304. In typical embodiments, the anodization is performed at 1-1.5 A/dm$^2$ for 30 to 45 minutes in an electrolyte containing solution, for example. Where the starting aluminum alloy housing is first polished to a mirror finish, the housing is anodized in the bath until an approximately 16 μm to 25 μm, anodization layer is formed. However, within any one part, controlled anodization is maintained to keep the layer on that part substantially uniform, so for example, a part has a uniform anodization layer of 18 μm across its entire exterior surface. Anodization layers can be formed of aluminum oxide, or other like oxide, and should have a 10 nm to 40 nm average diameter pore size.

Alternatively, where the starting aluminum alloy housing is textured via media blasting and the housing is anodized in the bath 300 until an approximate 16 μm to 20 μm anodization layer is formed. As above, within any one part, controlled anodization is maintained to keep the layer on that part substantially uniform. Also as above, the anodization layer can be formed of aluminum oxide, or other like oxide, and should exhibit a 10 nm to 40 nm average diameter pore size. Anodization parameters are often more easily attained for the textured housing, as the roughened surface can act as an initiation or nucleation site for the anodization reaction.

Figure 3B:
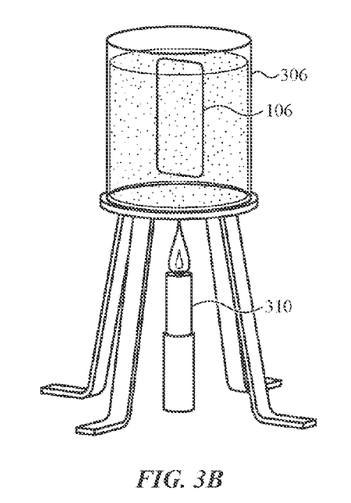
FIG. 3B shows an anodized housing undergoing dyeing in accordance with embodiments herein.

FIG. 3B shows a schematic of a dye bath 306 in accordance with embodiments herein. Anodized housings 106 are rinsed and moved to a heated dye bath. The dye bath 306 is prepared with a dark dye, black for example, and heated to an appropriate temperature to saturate the anodized layer (the layer having an average pore size of 10-40 nm). In one embodiment, the dye bath is heated to between 50° C. and 55° C., and more typically to 55° C., by an appropriate heating source 310. In another embodiment, the dye is at a concentration of 8 g/L to 12 g/L, and more typically 10 g/L. Once heated to an appropriate bath temperature, the housing 106 is submerged in the dye for a period of from about 5 to 20 minutes, and more typically, form about 15 to 20 minutes. Over saturation in the dye bath 306 can lead to anodization layer chipping or other like damage. Dye is incorporated into the porous anodization layer to impart the deep dye color to the anodization layer. Typically the dye flows into the pores (10-40 nm) of the anodized surface. In some embodiments, the dye bath may also contain a stabilizer to control the pH.

In some embodiments, the dye uniformly distributes in the anodization layer to a depth of at least 3 μm, in other embodiments, at least 5 μm, in still other embodiments, at least 7 μm, and in still other embodiments to a depth of from 8 μm to 10 μm. For purposes herein, stable dye incorporation into the anodization layer, with appropriate pore size, should be to a sufficient depth to allow polishing of the anodization layer so that removal of some portion of the layer does not affect the deep dye color of the housing surface.

Figure 4:
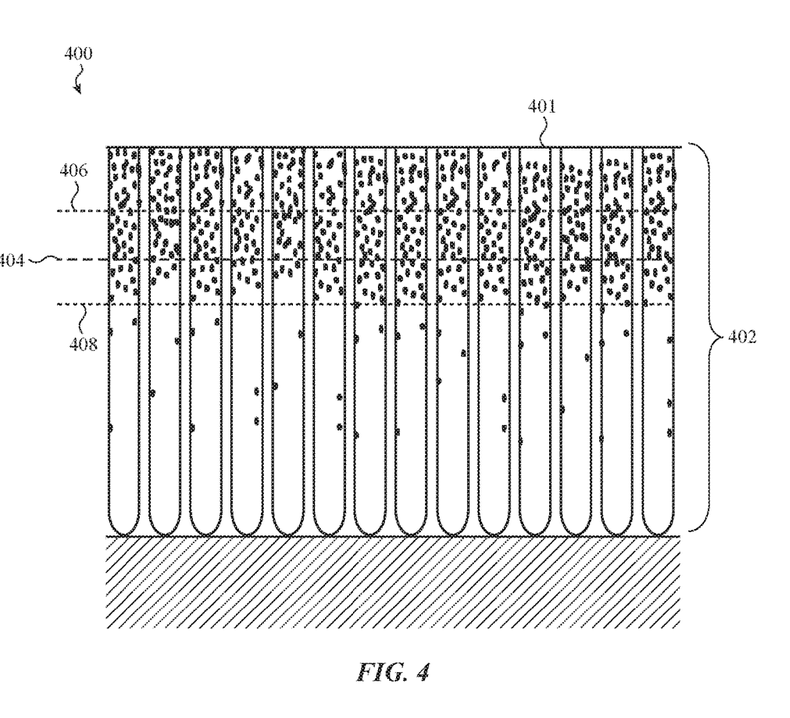
FIG. 4 is an exploded view of a dye saturated anodization layer in accordance with embodiments herein.

FIG. 4 shows a representative schematic cross-sectional view of a housing surface 400 having an anodization layer 402 dyed deep black in accordance with the embodiment herein. The dyed anodization layer is represented by surface 401. A second polish can be applied to the dyed anodization layer. Polish of the dyed anodization layer results in a smooth high gloss look with a deep color. Embodiments herein include a polish that removes from about 4 μm+/−2 μm of the dyed anodization layer (shown as solid black line, or surface 404). A polish that removes too little of the dyed anodized layer can result in a low gloss finish, or an "orange peel" finish (shown as dashed line, 406). As shown in FIG. 4, polishing removal of two or less μm from the dyed anodization layer can result in this deleterious look. However, removal of too much dyed anodization layer may conversely result in a variable color on the surface housing, as the dye has not consistently saturated to the depth beyond which the layer has been removed (shown as dashed line, 408). FIG. 4, dashed line 408, illustrates that polishing of the layer to the extent that 10 μm is removed, would likely result in an inconsistent amount of dye being exposed on the surface of the housing, thus showing a non-uniform coloration (discoloration).

As previously discussed, a matted or textured housing surface may also be anodized and dyed. The anodized surface in this embodiment will have an anodization layer that corresponds to the surface roughness of the blasted housing. The surface roughness provides the matted, textured appearance to the housing.

Figure 5:
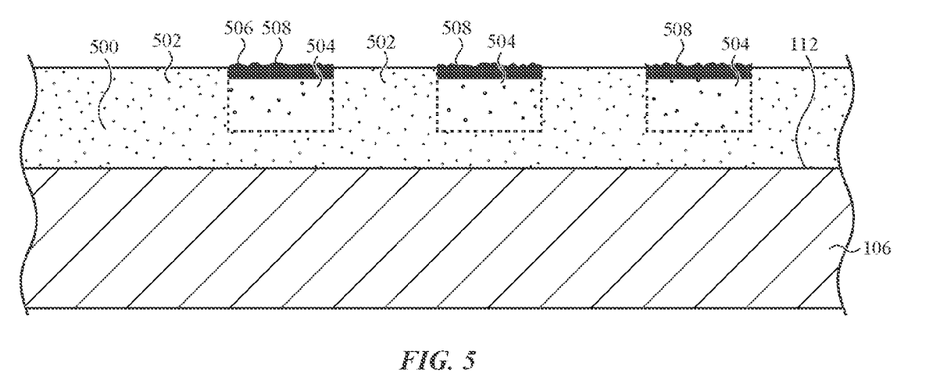
FIG. 5 shows a cross-sectional schematic view of a bleached marking in accordance with embodiments herein.

FIG. 5 shows an anodization layer 500 having black dye 502 incorporated therein. The anodization layer 500 abuts and extends off an exterior surface 112 of the aluminum alloy substrate 106. A series of spots or regions 504 in the anodized layer 500 can be altered or modified by laser bleaching to form markings on the housing. Laser bleaching is tuned to selectively lighten the anodization layer, while melting 508 the anodization layer surface to show a smooth finish 506.

Regions of the exterior surface of the housing may be selectively altered by laser bleaching to form preselected markings. Markings on the exterior surface of the housing can be altered to provide a significantly lighter appearance than the unaltered housing surface which has a deep black, or other dark, color.

Laser bleaching generally includes a scanning output of a laser over a dyed anodized portion of the housing's exterior surface. The laser may include a galvanometer mirror or other arrangement to form a spot of optical energy over the anodized surface. The scanning output of the laser, including scan speed, laser marking diameter, and line-to-line spacing, are controlled to minimize thermal stress on the anodized housing, and thereby avoid micro-fracture formation in the anodized surface. Parameters discussed herein have been adapted to bleach the anodized surface, minimize micro-fracture formation in the anodized surface, and cause some minimal melting of the anodization layer on the surface to result in a melted or smooth look.

Figure 6A:
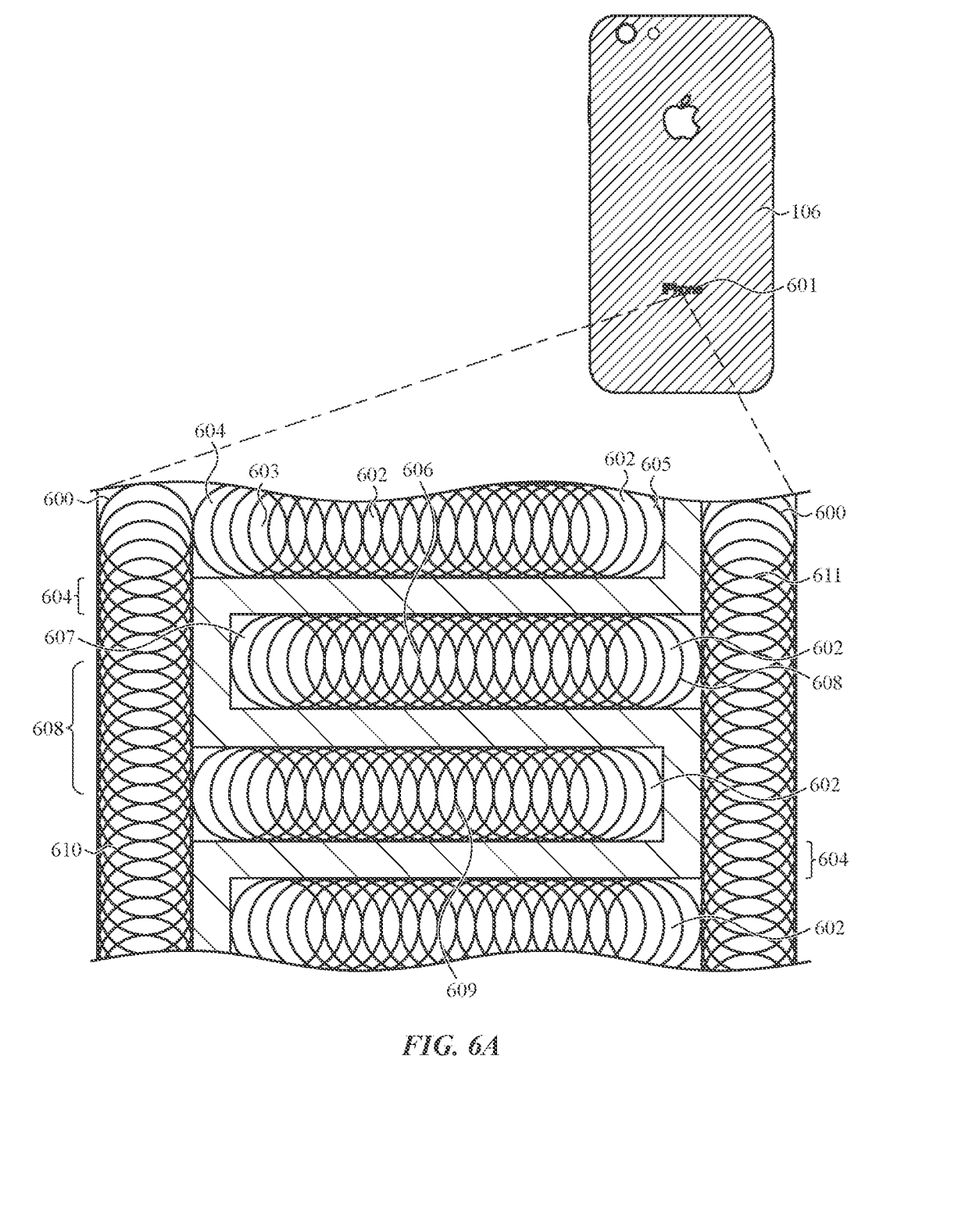
FIG. 6A illustrates a housing of a handheld electronic device having a product mark with a bleaching pattern according to one embodiment described herein.

FIG. 6A shows a series of laser etching or overlapping laser markings or scanning spots 600 that form a bleached mark for the word, iPhone 601. In between each of the bleached rows or portions 602 is a non-bleached area or row 604.

The iPhone mark shown in FIG. 6A illustrates bleaching, formed by a laser, of a first portion 603 of a mark into an exterior surface of the dyed anodization layer of the aluminum alloy. The first portion 603 defines a first end 604 of the first portion and second end 605 of the first portion. The mark may also have a bleached second portion 606 formed by the laser into the exterior surface of the dyed anodization layer, the second portion defining a first end of the second portion 607 and second end of the second portion 608; as well as a bleached third portion 609, bleached fourth portion 610, and bleached fifth portion 611, for example, each having a first end and second end, respectively. The first, second, and third portions are parallel to one another and extend in a first direction, while the fourth and fifth portions are parallel to each other and extend in a second direction that is perpendicular to the first direction. In some embodiments, the fourth portion either overlaps or is adjacent to the first end of the first portion and the first end of the third portion, and is spaced apart from the first end of the second portion. The fifth portion either overlaps or is adjacent to the second end of the second portion, and is spaced apart from the second end of the first portion and the second end of the third portion. This laser etching pattern may be continued with additional bleached rows that run either parallel to each other or perpendicular to each other. Note that in typical embodiments, the bleached portions of the mark are visually indistinguishable from one another without magnification (or are indistinguishable to the unaided eye).

Figure 6B:
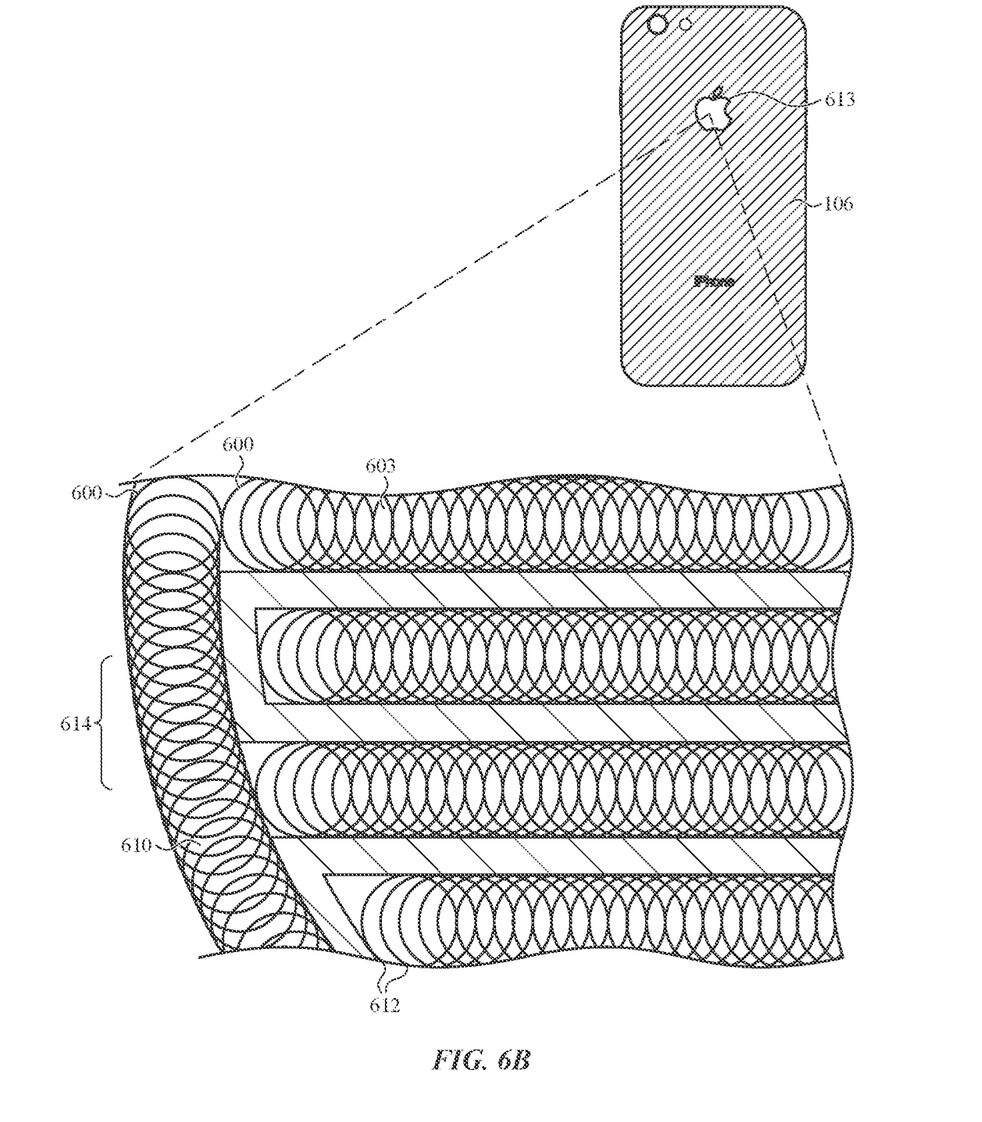
FIG. 6B illustrates a housing of a handheld electronic device having a product mark with a bleaching pattern according to an alternative embodiment described herein.

FIG. 6B shows an alternative embodiment of a logo 613 using the same bleached portions as described in FIG. 6A. Here the bleached fourth portion 610 shows a curve that extends along the exterior surface of the logo. In both FIGS. 6A and 6B the combination of bleached portions and unbleached portions are configured and provide the bleached mark.

In one embodiment, the output of the laser scan speed, pulse frequency, laser markings and pulse to pulse overlap provide a high resolution, light mark. In some embodiments, the laser markings are circular, with a marking diameter of between 25 and 35 µm, and more typically 30 µm. In some embodiments the pulse-to-pulse overlap is greater than 90% 612 (see FIG. 6B). In some embodiments, laser marks may have a slightly larger focal diameter with an overlap, and in some embodiments the laser marks may have a diameter of 38 to 42 µm, and more typically 40 µm. Typical line-to-line spacing 614 between any two bleached portions or rows is approximately 40 µm. The laser can be a an ultraviolet (UV) laser.

Results of laser bleaching a mark into a polished or textured dyed anodization layer produces a modified or altered dye region in the housing. The altered regions of the dye are formed into the predetermined mark shape, which has a significantly lighter appearance than the non-bleached housing surface. In some embodiments, the laser bleaching produces significantly fewer micro-fractures in the anodization layer than does more conventional mark formation. For example, using the above parameters, few if any micro-cracks are formed during the laser etching process, as the parameters have been identified to lower heat accumulation. The markings herein provide high reliability that the marking will not exhibit anodization cracking, a significant problem where the laser etching is significantly overlapping between rows or bleached portions. In addition, the laser bleaching process described herein can be utilized to slightly melt the top 1-2 µm of the dyed anodization layer, thereby showing a smooth surface. In some embodiments, the melted anodization layer has a surface roughness (Ra) of between 60 nm and 80 nm.

Laser markings in accordance with embodiments herein can also be used to produce a textured or rough laser marking. Rough laser marks have a surface roughness of greater than 1 µm, and are formed by using an appropriate laser pulse frequency, and a pulse-to-pulse overlap of less than 90%. The laser focus position is also adjusted to obtain the desired surface roughness. Otherwise the parameters are equivalent to the smooth laser mark parameters disclosed above and herein.

Figure 7:
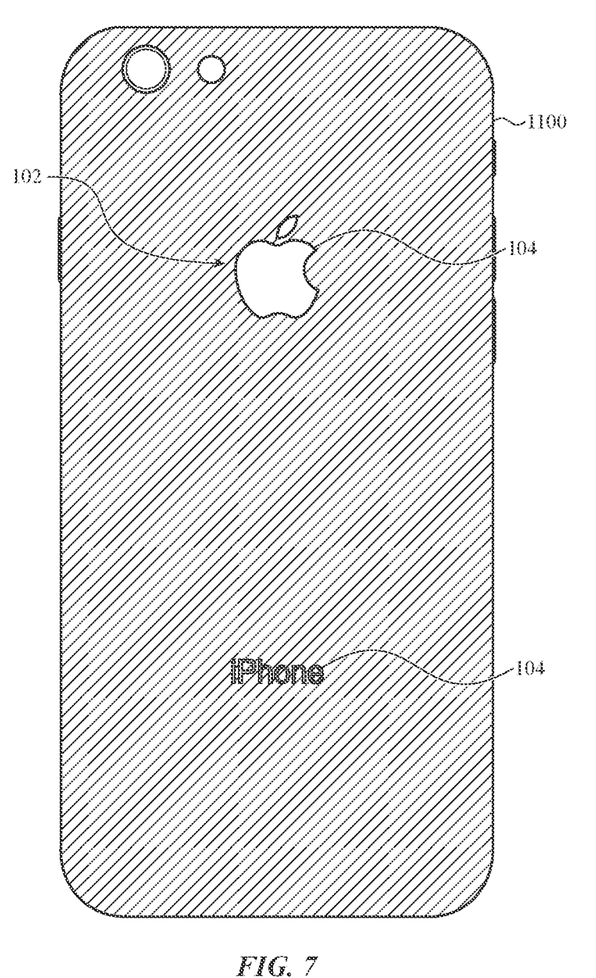
FIG. 7 illustrates a housing with markings in accordance with embodiments described herein.

FIG. 7 illustrates a mobile phone having a laser bleached logo etched into its dyed anodized layer. The housing has a black dyed anodized layer with a lightness (L*) number of 30 or less, while the bleached marking has a L* of at least 50 or more. In other embodiments, the housing has a black dyed anodized layer with a L* number of 25 or less, and the bleached marking has a L* of at least 60 or more. This substantial different in lightness provides a high resolution and crisp mark. Note that Lightness is measured using the Commission Internationale de l'Eclairage (CIE) standard, where lightness of the sample is compared to a standard to provide a $\Delta L^*$, it is basically a difference of lightness and darkness. In some embodiments, therefore, the difference in lightness between the housing and bleached marking is at least 20, and more typically at least 30 or 35. In some embodiments, the difference in L* is 20, 25, 30, 35, 40 and the like. Finally, the laser etching parameters as described above have been identified to provide a slight thermal influx into the anodization layer. The laser etched layer undergoes minimal surface melting to show a smooth or glossed look, typically from between 1 and 2 µm into the surface is melted, i.e., to a depth of 1 µm to 2 µm.

Figure 8:
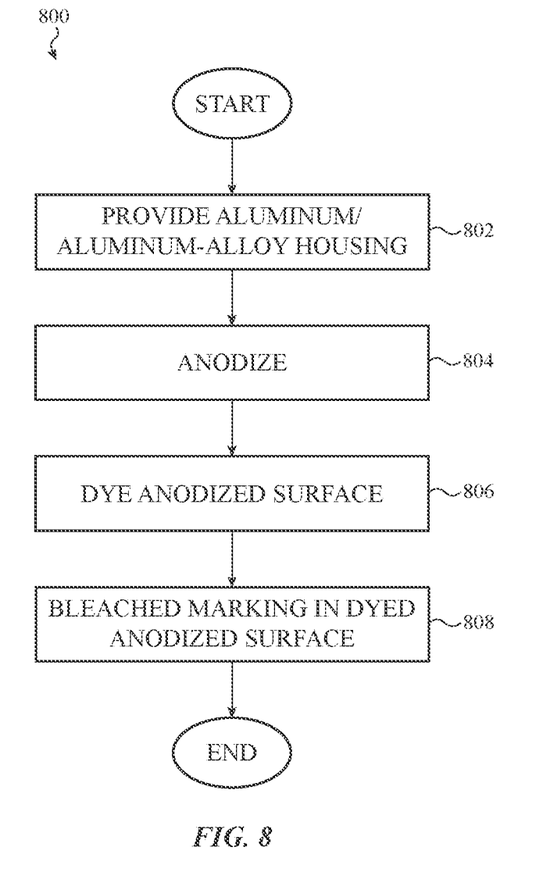
FIG. 8 is a flow diagram of marking processes in accordance with embodiments herein.

FIG. 8 is a flow diagram of a marking process in accordance with embodiments herein. The process 800 may begin with obtaining a housing for a handheld electronic device, where the housing is in need of one or more markings 802. In typical embodiments, the housing is composed of aluminum or is aluminum-based. The surface of the housing can be polished to a near mirror finish or media blasted to provide a matted or textured surface. The housing is anodized to provide an anodization layer having average pore diameters of from about 10 nm-40 nm 804, and more typically 15 nm to 35 nm. Once anodized, the anodization layer is dyed black or other dark color, to show a deep black color, for example 806. A mark is then bleached into a visible exterior surface of the dyed anodized housing 808. Laser bleaching may be accomplished by a UV laser as described in accordance with embodiments herein. The laser is scanned over the dyed anodized layer in accordance with the disclosure herein, while limiting thermal stress to the anodization layer. A bleached pattern is utilized to create a mark. Sufficient scanning parameters are provided to also induce melting within the bleach pattern.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An aluminum housing for a handheld electronic device, comprising:
   a dyed anodization layer;
   an alloy substrate adjacent the dyed anodization layer; and
   a melted portion of the dyed anodization layer; wherein the melted portion has a depth of 1 to 2 µm.

2. The housing of claim 1, wherein the melted portion has a surface roughness of approximately 60 nm to 80 nm.

3. The housing of claim 1, wherein the melted portion has a surface roughness of at least 1 µm or more.

4. The housing of claim 1, wherein:
the dyed anodized layer has a L* value of at least 30 or less; and
the melted portion has a L* value of at least 50 or more.

5. The housing of claim 4, wherein:
the dyed anodized layer has a L* value of at least 25 or less; and
the melted portion has a L* value of at least 60 or more.

6. The housing of claim 1, wherein the handheld electronic device is a mobile phone.

7. A handheld electronic device comprising:
an aluminum alloy substrate having an interior surface configured to receive a plurality of electronic components associated with the handheld electronic device, and an exterior surface;
an external dyed anodization layer abutting the exterior surface of the aluminum alloy substrate; and
a bleached mark formed in the external dyed anodization layer; wherein
the bleached mark is formed at least partially from a series of overlapping laser markings.

8. The handheld electronic device of claim 7, wherein the bleached mark has a surface roughness within a range of 60 nm to 80 nm.

9. The handheld electronic device of claim 7, wherein the surface roughness is 1 μm or more.

10. The handheld electronic device of claim 7, wherein the series of overlapping laser markings is formed by a plurality of laser markings, each laser marking having an average diameter of 30 μm.

11. The handheld electronic device of claim 10, wherein any two adjacent laser markings in the series of overlapping laser markings overlap by at least 90%.

12. The handheld electronic device of claim 11, wherein the series of overlapping laser markings form a first bleached row, and a second bleached row, and a line-to-line distance between the first bleached row and the second bleached row is 40 μm.

13. A method of making a mark on a housing of an electronic device, comprising:
anodizing the housing, using an anodization apparatus, to form an anodization layer;
dyeing the anodization layer, using a dyeing apparatus, to form a dyed anodization layer; and
laser etching a region in the dyed anodization layer, using a laser, to form the mark on the housing;
wherein a Lightness L* difference between the dyed anodization layer and the mark is at least 25.

14. The method of claim 13, wherein the Lightness L* difference between the dyed anodized layer and the mark is at least 30.

15. The method of claim 13, wherein the Lightness L* difference between the dyed anodized layer and the mark is at least 35.

16. The method of claim 13, wherein the handheld electronic device is a mobile phone.

17. The method of claim 13, wherein the dyed anodization layer defines a first bleached row and a second bleached row, and the first bleached row and second bleached row have a line-to-line spacing of approximately 40 μm.

18. The method of claim 17, wherein approximately 10 μm of the line-to-line spacing is not bleached.

19. The method of claim 13, wherein the laser etching is performed by an ultraviolet laser.

20. The method of claim 13, wherein the mark on the housing has a surface roughness of approximately 60 nm to 80 nm.

* * * * *